ARBITRARY FUNCTION GENERATOR

Original Filed April 29, 1957 2 Sheets-Sheet 1

INVENTORS:
JAMES T. SAWYER
JOHN KELLIS FLORA
BY
Howson & Howson
Attys.

ARBITRARY FUNCTION GENERATOR

Original Filed April 29, 1957 2 Sheets-Sheet 2

INVENTORS:
JAMES T. SAWYER
JOHN KELLIS FLORA
BY
Howson & Howson
Attys.

United States Patent Office

Re. 25,032
Reissued Aug. 22, 1961

25,032

ARBITRARY FUNCTION GENERATOR

James T. Sawyer and John Kellis Flora, Huntsville, Ala., assignors to Compudyne Corporation, Hatboro, Pa., a corporation of Pennsylvania Original No. 2,835,773, dated May 20, 1958, Ser. No. 655,640, Apr. 29, 1957. Application for reissue May 17, 1960, Ser. No. 30,059
7 Claims. (Cl. 338—89)

Matter enclosed in heavy brackets [ ] appears in the original patent but forms no part of this reissue specification; matter printed in italics indicates the additions made by reissue.

This invention relates to an electrical device designated as an arbitrary function generator. It has for its main objects to provide such a device that will be highly satisfactory for the purpose intended, simple in structure, comparatively cheap to manufacture, easy to use and keep in working condition, and extremely durable.

Also the arbitrary function generator made according to this invention accomplishes the purpose of producing a voltage proportioned to the ordinate of a curve drawn with special conducting ink or fluid on paper or other insulating material. The advantage of being able to produce a voltage directly from a curve drawn on paper is that this method of preparing a function for conversion to a voltage is very inexpensive, convenient, and quick.

Other objects and advantages will appear from the drawings and description.

Figure 1:
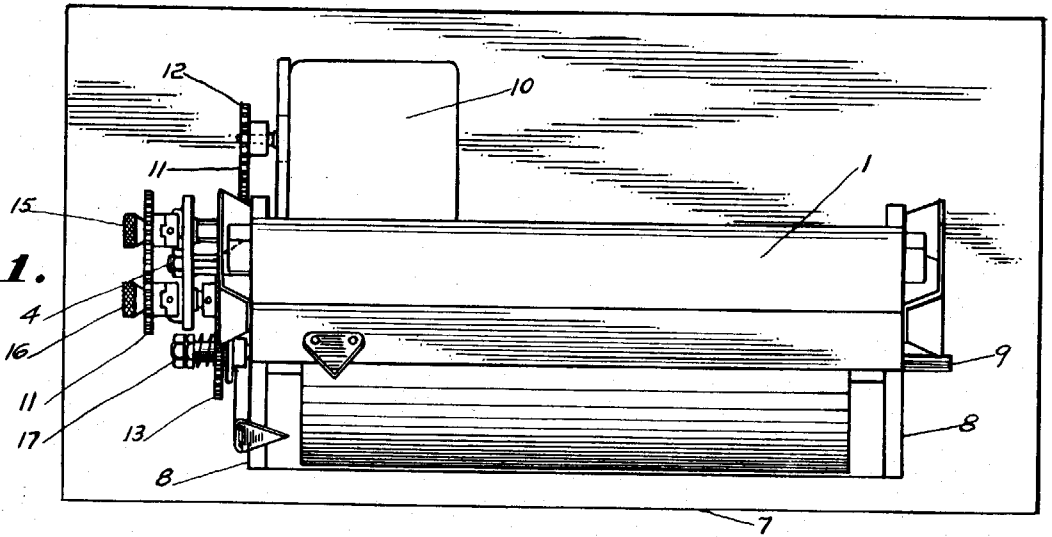
Figure 2:
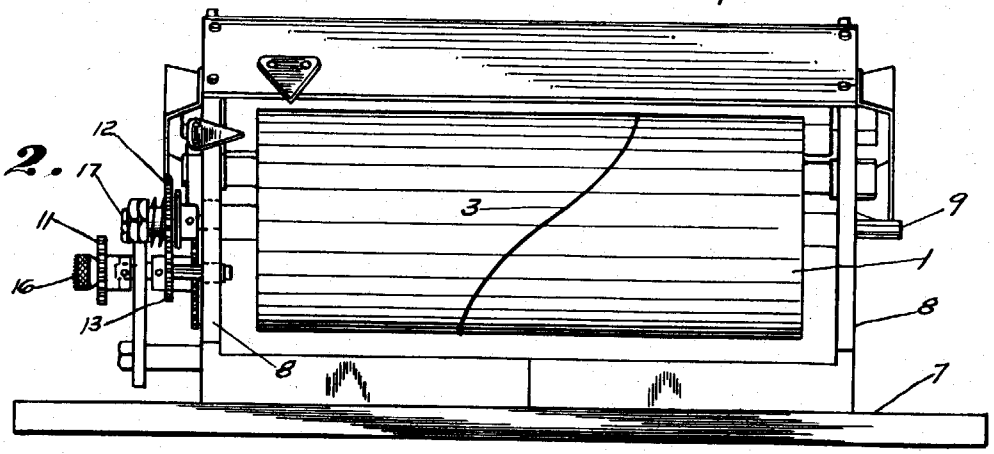
Figure 3:
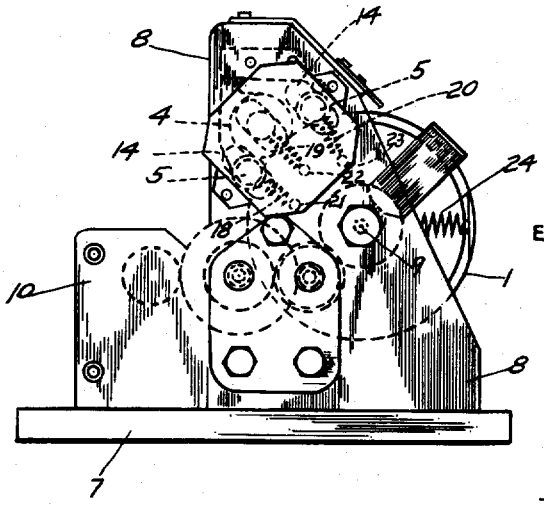
Figure 4:
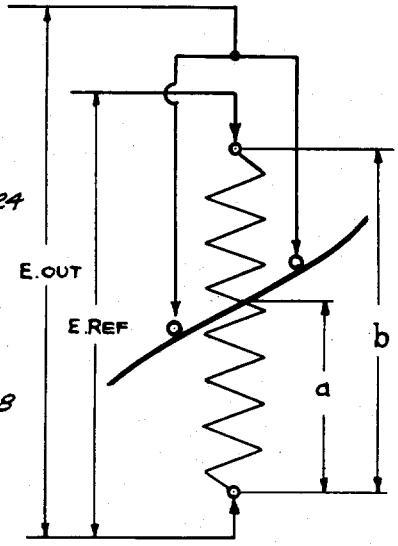
Figure 5:
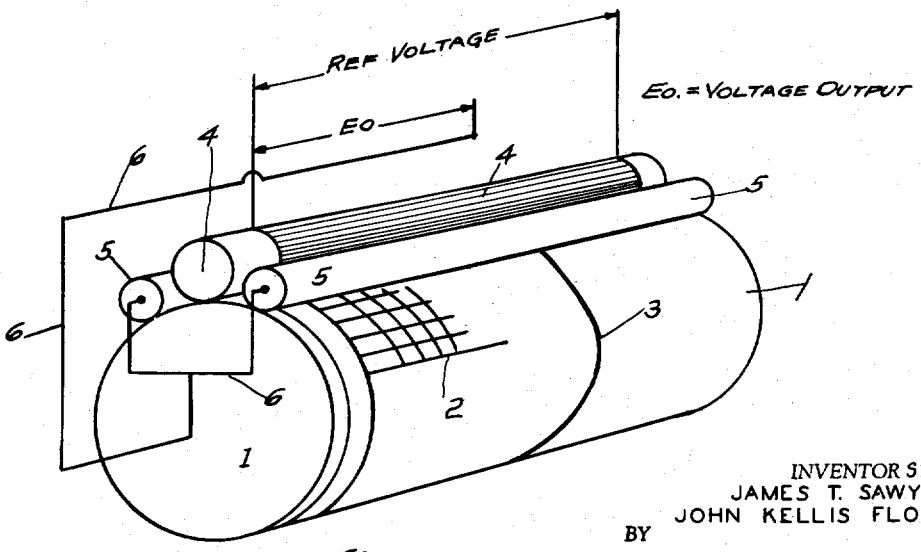

By referring generally to the drawings, it will be observed that Fig. 1 is a plan view of an arbitrary function generator made according to the present invention; Fig. 2 is a side elevational view of Fig. 1; Fig. 3 is an end elevational view of Fig. 1; Fig. 4 is a circuit diagram of the generator; and Fig. 5 is a perspective view of parts of the device showing the principle of operation.

Similar reference numerals refer to similar parts throughout the several views.

Referring to the drawings in detail it will be seen that the structure of the device comprises a rotatable metal drum 1 which is adapted to be driven by a suitable electric motor, a sheet of paper 2 attached around the drum, a curved line of electrically conductive ink 3 on the paper, a wire-wound potentiometer 4 with a resistance preferably exceeding about two thousand ohms, two rollers 5 made of ordinary metal plated with a precious metal so that the surface of the rollers will not corrode, to thus maintain good electrical contact properties. Wires 6 are connected as shown in FIG. 5. A main base 7 supports the side members 8. The drum is mounted on a shaft 9 that is supported in bearings in the side members. The drum is revolved by an electric motor 10 connected by chain 11 and sprockets 12 and 13. The side members are provided with slots 14 in which the shaft ends 15, 16 and 17 of the potentiometer 4 and rollers 5 are slidable. Springs 18, 19 and 20 are attached on studs 21, 22 and 23 and are adapted to hold the potentiometer and rollers adjacent the ink or fluid line on the paper on the drum. A spring type clip 24 holds the end of the paper on the drum.

Any suitable conductive ink may be used, such as Du Pont #4922 silver paste or similar, butyl acetate or other suitable solvent, Sauereisen #P-1 porcelain cement, or other finely ground inorganic filler; a small amount of plastic such as polyethylene dissolved in the butyl acetate solvent. The ink, when thinned to the proper consistency, flows easily and smoothly from an ordinary ruling pen, dries in about two minutes, and leaves a hard, durable line, which on the average is about 3/64 inch wide and is about .001 to .002 inch high. In the present invention the straightness tolerances of the potentiometer roller, contact rollers, and supporting surface of the drum are held much closer than this, thus assuring continuous contact. The same ink or fluid curve can be used many times, but will eventually wear out. Therefore the present type function generator is of greatest value where the input function desired changes rather frequently, and it is for this type application that it excels due to the ease and rapidity with which new ink or fluid curves can be prepared. Important features of the invention are that it is simple, convenient, and easy to operate. It also accurately produces voltage proportional to the ordinate of almost any shape of curve that can be drawn including step functions. In the past devices used to accomplish this purpose in this category have relied upon the use of servo-positioned followers or the use of wire glued to paper or inserted in a groove in a drum with a sliding contact maintained between the wire and potentiometer. The disadvantages of the former method are complexity, unreliability, possibility of the follower losing the curve and the limitation on the shape of acceptable curves. The disadvantages of the latter method are inconvenience of attaching the wire to the paper, or drum, the rapid wear on the potentiometer, the tendency toward noisy operation and the limitation on the shape of acceptable curves. These disadvantages are eliminated in the present invention by utilizing direct rolling contact and an ink or fluid line which can be easily drawn to any shape desired. It is also especially to be noted that a contact roller is located immediately to each side of the potentiometer roller, electrical continuity is required only between the potentiometer roller and either one of the contact rollers.

The various parts of the device may be made of any material suitable for the purpose, but we prefer to use materials generally used for such purposes. Also the parts may be made in different sizes and capacities depending on how and where to be used.

While we have shown and described the preferred embodiment of our invention, we do not wish to limit same to the exact and precise details of structure, and reserve the right to make all modifications and changes so long as they remain within the scope of the invention and the following claims.

Having described our invention we claim:

1. An arbitrary function generator of the class described comprising, a main supporting base, upward extending portions as sides attached opposite each other on the edge of the base, a shaft, said shaft supported by bearings in said sides, a metal drum mounted on said shaft, a sheet of paper attached removably around on the circumference face of said drum, a line of electric conductive ink upon said paper, said line of ink starting at an edge of the paper at an end of the drum and extending on the paper and curved around the drum and ending at the other edge of the paper at the other edge of the drum, said ink being of a quality to cause electric current to be transmitted thereby, the outer face of said ink line being slightly extended beyond the face of the paper; a roller potentiometer mounted by its ends supported in slots in said sides with its circumference face in contact with said ink line on said paper, springs attached to the ends of said roller potentiometer adapted to retain it in close contact with said ink line and paper, two contact rollers mounted by their ends in slots in said sides, said contact rollers being positioned one along and near each side of said potentiometer, the circumference faces of said contact rollers being in contact with said ink line and paper, springs attached to the ends of said contact rollers adapted to retain them in close contact with said ink line and paper; electric transmitting wires attached to said contact rollers; an electric motor mounted on said base and connected by variable chains and gears driving means to said drum for revolving same; said conductive ink being adapted to complete an electric circuit between said roller potentiometer and said contact rollers when the drum is being revolved and the ink line surface is in contact with said rollers.

2. An arbitrary function generator of the class described comprising, a main supporting base, upward extending sides attached opposite each other on opposite edges of the base, a shaft, said shaft supported by bearings in said sides, a chart drum mounted on said shaft, graph paper attached removably around on the entire circumference face of the drum, a line of electric conductive ink upon said paper, said line of ink starting at one edge of the paper and extending as a curve once around the drum on the paper and ending at the other edge of the paper, the outer face of said ink line being slightly extended beyond the face of the paper; a roller potentiometer mounted by its ends, said ends being supported in slots in said sides on the base with the circumference face of the potentiometer in contact with said ink line on said paper, springs attached to the ends of the roller potentiometer adapted to retain it in close contact with said ink line and paper, two contact rollers mounted by their ends in slots in said sides, said contact rollers being disposed one along and near each side of said potentiometer, the circumference faces of said contact rollers being in contact with said ink line and paper, springs attached to the ends of said contact rollers for holding them in close contact with said ink line and paper; a plurality of electric transmitting wires removably attached to said contact rollers; an electric motor mounted on said base and connected by variable chains and gears as driving means to said drum shaft for revolving the drum at different speeds, said conductive ink being adapted to complete an electric circuit between said roller potentiometer and said contact rollers when the drum is being revolved and the ink line surface is in contact with said rollers.

3. An arbitrary function generator of the class described having means for obtaining a voltage proportionate to the ordinate of a drawn curve, said means comprising, a main supporting base, upward extending sides attached opposite each other on opposite edges of the base, a shaft and bearings therefor, said shaft supported by the bearings in said sides, a drum designated as a chart drum, said drum mounted on a shaft and bearings therefor, said shaft bearings mounted in said sides, a sheet of graph paper attached removably around on the entire circumference face of the drum, a line of electric conductive fluid upon said paper, said line of fluid starting at one edge of the paper at an end of the drum and extending in curve shape once around the drum and on the paper and ending at the other edge of the paper at the opposite end of the drum, the outer face of said fluid line being slightly extended beyond the face of the paper; a roller type potentiometer mounted by its ends, said ends being supported in slots in said sides on the base with the circumference face of the potentiometer in contact with said fluid line on the paper, springs attached to the ends of the potentiometer adapted to retain it by tension of the springs in close contact with said fluid line and paper; two contact rollers with shaft ends, slots in said sides, said contact rollers mounted by the ends of their shafts in said slots, said rollers being positioned one along and near each side of said potentiometer, the circumference faces of said contact rollers being in contact with said fluid line and paper, springs attached to the shaft ends of said contact rollers, said springs by tension thereof adapted to retain said contact rollers in close contact with said fluid line and paper; a plurality of electric current transmitting wires removably attached to said contact rollers; an electric motor mounted on said base and connected by variable chains and gears as driving means to said drum shaft for revolving the drum at different speeds; said electric conductive line on the paper being adapted to complete an electric circuit between said roller potentiometer and said contact rollers at any place along the fluid curved line when the drum is being revolved and contacts are maintained between the faces of the three said rollers and the surface of the fluid line.

*4. An arbitrary function generator of the class described comprising a supporting frame, a sheet support rotatably supported on the frame providing a surface of rotation about the axis of rotation and adapted to removably support an insulating sheet against said surface of rotation, a potentiometer resistance element, at least one conductive contact member, said potentiometer resistance element and said conductive contact member each being supported on the supporting frame in opposition to surfaces on the sheet support so that they are urged toward the sheet support and into contact with any conductive line on any insulating sheet which may be supported on said surfaces of the sheet support, whereby said conductive line is adapted to complete an electric circuit between said potentiometer resistance element and said conductive contact member, the variable generated by the arbitrary function generator being primarily the resistance of the potentiometer between the conductive line and one end of the potientometer resistance element which may vary in accordance with any arbitrarily selected function as the sheet support is rotated.*

*5. The arbitrary function generator of claim 4 in which the sheet support is a right circular cylindrical drum supported on the frame to rotate about its major axis and the potentiometer resistance element and at least one conductive contact member are generally parallel elements urged into contact with the drum or a conductive line on an insulating sheet supported thereon.*

*6. The arbitrary function generator of claim 5 in which there are two conductive contact members each of which is a roller with its axis of rotation parallel to that of the sheet support drum and in which the contact rollers are positioned on each side of the potentiometer resistance element and close spaced thereto.*

*7. An arbitrary function generator of the class described comprising a supporting frame, a right circular cylindrical drum adapted to removably support a flexible sheet, a flexible sheet mounted on the drum to conform to its cylindrical surface and having a conductive line on its outer surface extending above the plane of the paper, a potentiometer resistance element supported on the frame parallel to the axis of the drum and urged toward the drum and into electrical contact with the conductive line on the sheet, at least one conductive roller rotatably supported on the frame and resiliently urged toward the drum and into electrical contact with the conductive line on the sheet, electrical connections on at least one conductive roller and on one end of the potentiometer resistance element so that in a circuit between the terminals the conductive line on the sheet completes a circuit between the roller and some point on the potentiometer resistance element and the resistance varies in accordance with the length of the potentiometer resistance between the contact point and the terminal.*

References Cited in the file of this patent

UNITED STATES PATENTS

| | | |
|---|---|---|
| 2,554,811 | Bromberg et al. | May 29, 1951 |
| 2,662,955 | Erkelens | Dec. 15, 1953 |
| 2,761,102 | Brown | Aug. 28, 1956 |
| 2,820,871 | Smith | Jan. 21, 1958 |

FOREIGN PATENTS

| | | |
|---|---|---|
| 694,260 | Germany | July 4, 1940 |